UNITED STATES PATENT OFFICE.

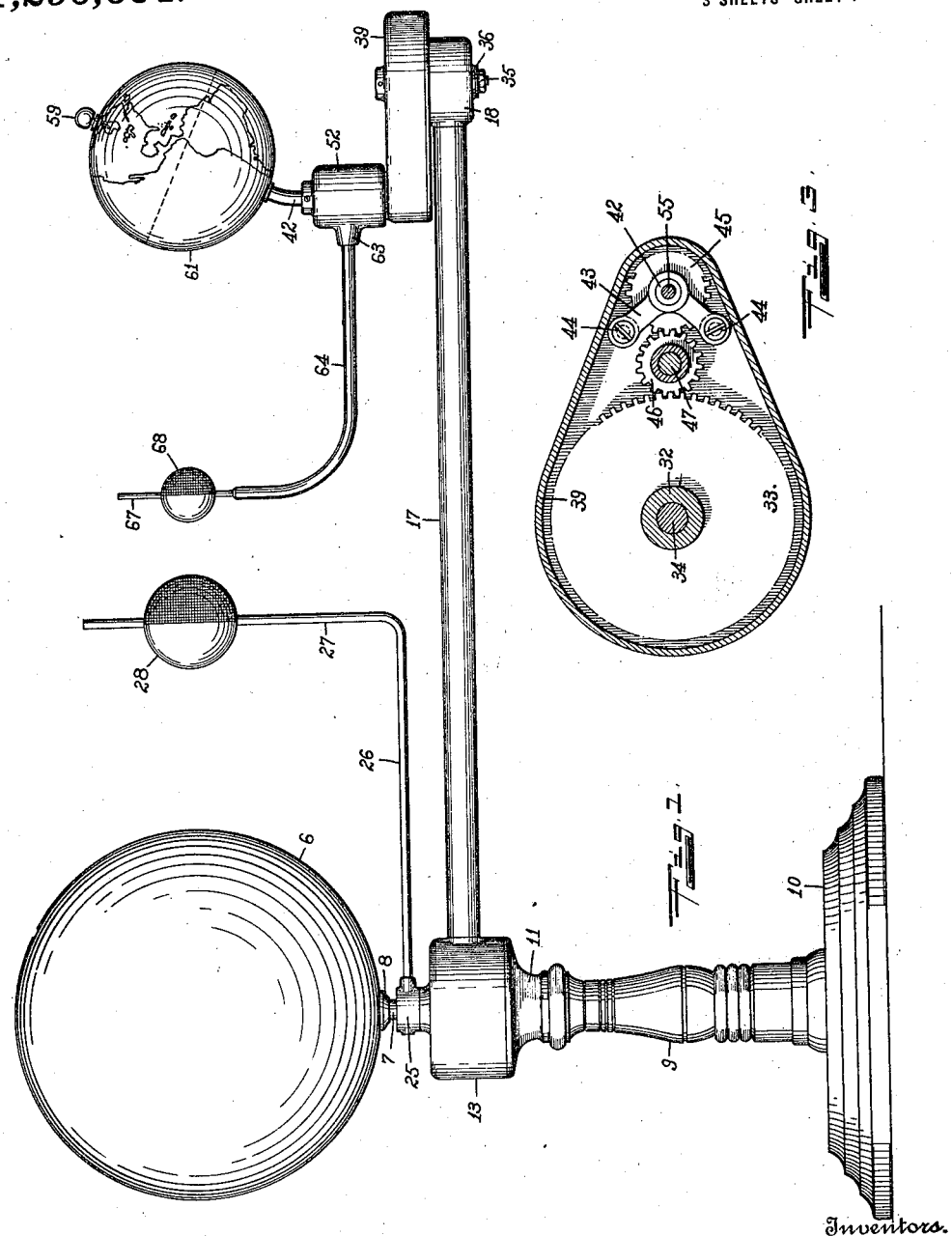

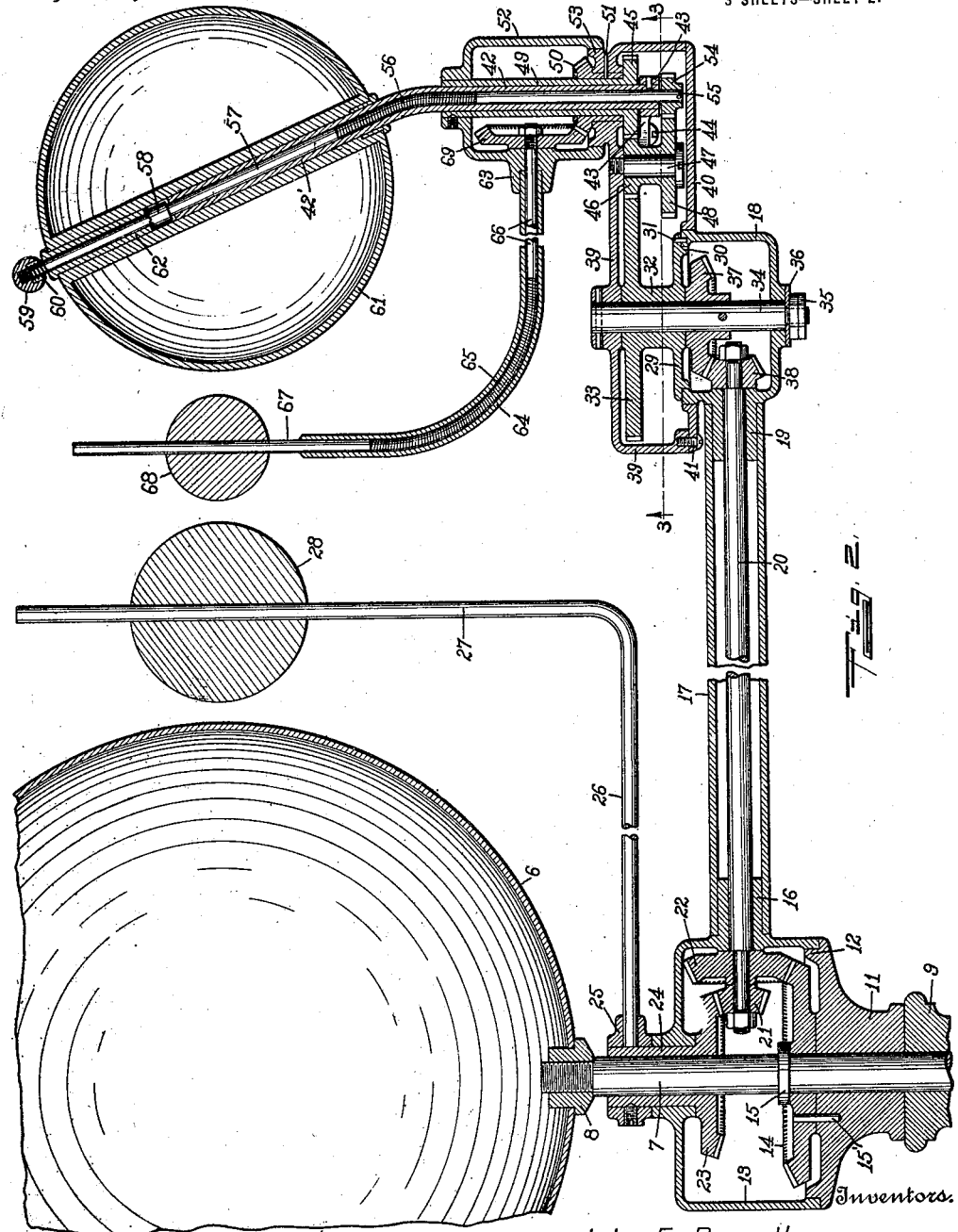

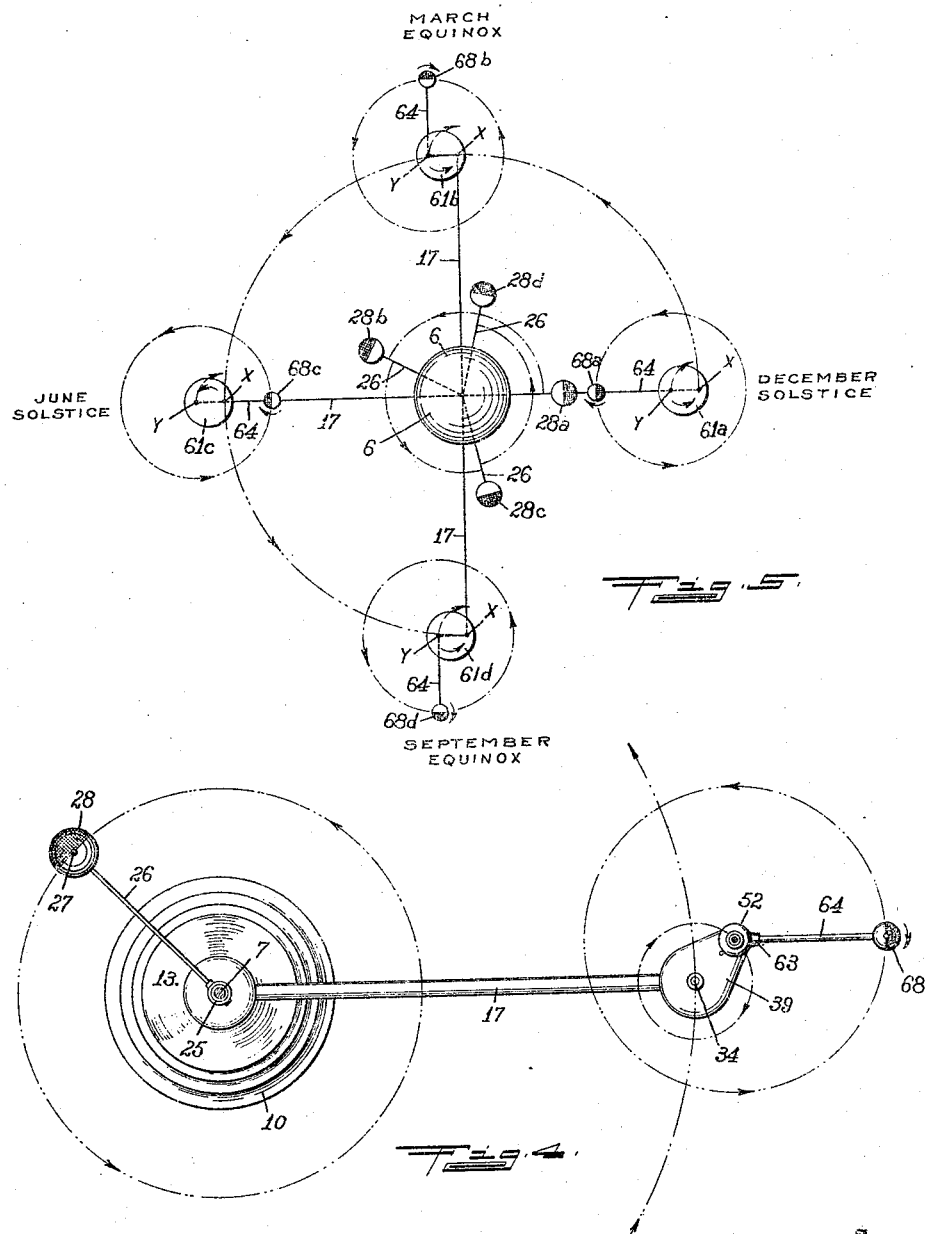

JOHN E. RUSSELL AND LE GRANDE S. HAWKES, OF OMAHA, NEBRASKA.

PLANETARIUM.

1,290,664. Specification of Letters Patent. Patented Jan. 7, 1919.

Application filed March 13, 1917. Serial No. 154,625.

*To all whom it may concern:*

Be it known that we, JOHN E. RUSSELL and LE GRANDE S. HAWKES, citizens of the United States, and residents of Omaha, in the county of Douglas and State of Nebraska, have invented certain new and useful Improvements in Planetariums, of which the following is a specification.

Our invention relates to planetariums or devices for representing mechanically various movements and positions of bodies of the solar system, as for use in schools to explain the natural phenomena arising from planetary and lunar movements. It is the object of our invention to provide means for representing the sun, the earth, the moon, and a planet, such as Venus, whose orbit lies between the sun and that of the earth; to provide actuating means for causing representation of orbital movements of the earth and the other planet, the rotation of the earth upon its axis, and the revolution of the moon about the earth; to provide means by which the body representing the moon is maintained with one side constantly toward the sun-representing body; to provide means for simulating the eccentric orbital path of the earth relatively to the sun; to provide for representation of the axial inclination of the earth to the plane of the ecliptic; and to provide means for inclosing and concealing the various actuating means.

In the accompanying drawings Figure 1 is a side view of mechanism embodying our invention, Fig. 2 is a detail vertical section of the same, with portions broken away, Fig. 3 is a detail horizontal section on the plane of the line 3—3 of Fig. 2, Fig. 4 is a horizontal section of the mechanism, taken above the major actuating mechanism, and Fig. 5 is a diagrammatic view showing several characteristic positions of the moving parts.

In the illustrated embodiment of our invention there is provided a large hollow sphere 6, representing the sun, the same being carried at the upper end of a vertical rod 7, a socket 8 being arranged at one side of the sphere and the threaded upper end of the rod being screwed into the socket, as shown in Fig. 2. Said rod 7 is fixedly connected with a standard 9 of which the lower end is secured to a heavy base 10 on which the entire apparatus is supported. Said base, the standard 9, rod 7 and sphere 6 are stationary, and there is also a stationary head 11 at the upper end of the standard, said head having an annular flange 12 near the outer edge thereof, about which the lower edge of a cylindrical casing or shell 13 fits revolubly. A bevel gear 14 rests on the upper side of the head 11 within the shell 13, said gear being held upon the head by a flange 15 on the center-rod 7, and being secured in fixed relation to the head by a dowel-pin 15'. At one side of the shell 13 an integral sleeve 16 extends horizontally therefrom, and on said sleeve is fitted and secured one end of a tubular arm 17. At the outer end of said tubular arm is carried a cylindrical casing 18, having an integral sleeve-portion 19 extending into and secured to the arm. The sleeves 16 and 19 form bearings for a shaft 20 which extends through and is inclosed by the arm 17. On the end of the shaft 20 within the shell 13 there are secured two bevel pinions 21 and 22, the latter meshing with the fixed bevel gear 14, and the pinion 21 meshing with a bevel gear 23 which fits revolubly on the center-rod 7. The gear 23 has a hub-portion 24 which passes through the upper side of the casing 13, fitting revolubly therein, and to the protruding portion of said hub above the casing there is secured a collar 25. From said collar a rod 26 extends out horizontally to a point well beyond the periphery of the sphere 6, and has an integral vertical portion 27 extending up through a horizontal plane intersecting the center of said sphere. On the vertical rod-portion 27 is carried a ball 28 which fits slidably on the rod so as to be frictionally retained at any place to which it may be moved. The ball 28 is employed to represent a planet, such as Venus, whose orbit lies between the sun and the orbit of the earth, and said ball 28 is preferably painted black or otherwise dark-colored on the hemispherical surface thereof opposite the sphere 6, the other hemisphere thereof being white or light-colored, thereby indicating the illuminated and unilluminated hemispheres of the planet.

The casing 18 has a cover-plate 29 fitting on the upper side thereof, said plate having a flange 30 fitting within the opening at the top of said casing, and a dowel-pin 31 being provided as shown in Fig. 2, for preventing rotation of the plate relatively to the casing. The cover-plate 29 has a central upwardly projecting sleeve 32 carrying a gear wheel 33, which may be integral therewith as shown. A shaft 34 extends vertically through the casing 18, fitting revolubly within an opening in the bottom of said casing and an opening through the cover 29, sleeve 32 and gear 33. The lower end of said shaft 34 is shouldered and threaded, nuts 35 being screwed onto the threaded portion and holding a washer 36 against the shoulder. The outer portion of the washer rests against the face of a boss on the lower side of the casing and prevents upward movement of the shaft. On the shaft 34 within the casing 18 a bevel gear 37 is secured, said gear meshing with a bevel pinion 38 carried on the adjacent end of the shaft 20. To the upper end of the shaft 34 is secured a casing or housing 39 having a bottom-plate 40 removably secured thereon by screws 41, said bottom-plate having an opening therein concentric with the shaft 34, and the upper end of the casing 18 fitting within said opening, so that the housing 39 is revoluble about said casing. The housing 39 has converging side-portions extending laterally from the large rounded end-portion which is concentric with the gear 33, and said side-portions merge into a smaller rounded end-portion, as shown clearly in Fig. 3. At the center of the latter end-portion of the housing a tubular stem 42 is secured to the hub-portion of a spider 43 which is removably secured in the housing by screws 44, the hub-portion being held in spaced relation to the upper and lower sides of the casing or housing. Above the spider a gear 45 fits revolubly on the stem 42, said gear meshing with a pinion 46 which is revolubly mounted on a stud 47 carried within the housing as shown. The pinion 46 meshes with the gear 33 so as to be driven thereby during rotation of the housing about said gear. A gear 48 is also carried on the stud 47, said gear being secured to or integral with the pinion 46, so as to be driven thereby. The gear 45 has a long sleeve-hub 49 which extends up through the top of the housing, fitting revolubly within the hub-portion of a bevel pinion 50 which is fixedly secured to the housing by a pin 51 or the like. To the upper end of the sleeve-hub 49 is secured a casing 52 of which the sides extend down so as to inclose the pinion 50, the lower end of the casing fitting revolubly about an annular flange 53 integral with the housing 39. Above the end of the sleeve-hub 49 and the upper end of the casing 52 the tubular stem 42 is bent laterally toward the axis of the shaft 34, so that the upper portion 42' of said stem extends at an angle of about 23½ degrees to the vertical lower portion thereof. It will be seen that, as the stem is fixedly connected with the housing through the medium of the spider 43 and screws 44, the inclined upper stem portion 42' will remain constantly in the vertical plane which intersects longitudinally the axes of the shaft 34 and the lower stem-portion 42.

The gear 48 meshes with a pinion 54 secured beneath the spider 43 on the lower end of a small shaft 55 which extends up through the tubular stem 42, fitting revolubly therein. In the bent portion of the stem there is a flexible shaft-portion 56 which is continuous with and operatively connects the part 55 with a like part 57 fitting revolubly in the upper or angular stem-portion 42'. The shaft-portion 57 projects beyond the end of the stem and carries adjacent thereto a collar 58 of which the upper end is serrated to form a clutch-member. The upper terminal part of the shaft is threaded and has screwed thereon a spherical nut 59 having a cylindrical counterbore in the lower part thereof in which is disposed a small coil spring 60. A globe 61 is provided having an axial opening therein of which the lower portion fits revolubly upon the angular stem 42', and the upper part of the opening has a sleeve 62 secured therein and fitting slidably upon the shaft 57. The lower end of the sleeve 62 is serrated to form a mating clutch-member for engagement with the collar 58 on the shaft; and the spring 60 bears against the upper end of said sleeve to hold the clutch-members normally in engagement with each other. Thus, normally, rotation of the shaft 55, 56, 57 will cause rotation of the globe 61; but by slightly raising the latter and thereby compressing the spring 60 the clutch-members 58 and 62 may be disengaged to permit the globe to be turned independently of the shaft. The globe 61 is used to represent the earth, and preferably has upon its surface the usual conventional indications of the continents, oceans, meridians, equator, etc.

At one side of the casing 52 there is a laterally projecting nipple 63 in which is secured the end of a tube 64. Said tube extends out horizontally and then curves upwardly so that the terminal portion thereof extends vertically. Fitting revolubly within the tube 64 there is a shaft having an intermediate flexible portion 65 within the curved part of the tube, and rigid terminal portions 66 and 67 fitting, respectively, within the horizontal and vertical portions of the tube. The shaft-portion 67 extends vertically beyond the upper end of the tube and carries a small ball 68 which fits thereon so as to be retained frictionally at any place to which it is moved. Preferably one side or hemisphere of the ball 68 is dark-colored and the other light-colored, said ball being employed to represent the moon, and the differently-colored portions representing the illuminated and unilluminated surfaces thereof.

In the operation of the mechanism the tubular arm 17 is merely rotated about the fixed vertical axis of the rod 7 or supporting standard, and such movement actuates the various parts to cause appropriate representation of the planetary and lunar movements. Thus, during the rotation of the arm 17 and shell 13, the bevel pinion 22 rolls about the stationary bevel gear 14, causing rotation of the shaft 20. The latter drives the bevel pinion 21 which actuates the bevel gear 23, causing rotation of the collar 25 and arm 26. The gearing is so proportioned that said arm 26 and the ball 28 will make about one and two-thirds revolutions about the sphere 6 while the arm 17 is making one revolution thereabout, the movements of the arms 26 and 17 thus being approximately proportional, respectively, to the orbital movements of the planet Venus and of the earth about the sun. The ratio of the pinion 22 to the gear 14 is the same as that of the pinion 38 to the gear 37, and as a result thereof the shaft 34 and housing 39 make one revolution about the axis of said shaft to each revolution of the arm 17 about the fixed axis of the center-rod 7. In consequence of this arrangement, a vertical plane passing through the axes of the shaft 34 and the tubular stem 42, 42', remains constant in direction for all positions of the arm 17. In other words, the vertical plane on which the housing 39 and the parts thereto affixed are sectioned in Fig. 2 occupies positions which are constantly parallel to each other no matter what may be the position of the tubular supporting arm 17. Thus, the axis of the shaft 55 moves in a circular path of the same radius as the circular path of the axis of the shaft 34, but the former is eccentric to the latter by an amount equal to the distance between the axes. Since the path of the shaft 34 is concentric with the sphere 6, while the center of the globe 61 is in constant or fixed relation to the axis of the shaft 55, said globe moves eccentrically to the sphere, thus simulating the eccentricity of the earth's orbit about the sun. In the present mechanism no attempt is made to represent the ellipticity of the earth's orbit, the same being so small in proportion to the diameter that simulation thereof is deemed unnecessary for illustrative purposes.

Referring now to the actuation of parts resulting from rotation of the housing 39 about the vertical axis of the shaft 34, it will be seen that during the rotation of said housing the pinion 46 will roll about the relatively-fixed gear 33, since the latter is affixed to the casing 18 through the medium of the parts 32, 29 and 31. The pinion 46 drives the gear 45, causing rotation thereof about the stem 42, and said gear causing rotation of the casing 52, with which it is connected by the sleeve-hub 49. The pinion 46, being affixed to or integral with the gear 48, also drives or actuates the pinion 54, through the medium of said gear 48, and the pinion 54 causes a relatively rapid rotation of the shaft 55. The movement of said shaft 55 is communicated through the flexible portion 56 to the upper portion 57, and from the latter through the clutch-members 58 and 62 to the globe 61, causing rotation of said globe about the inclined stem 42', and thus simulating the rotation of the earth about its axis which is uniformly inclined to the plane of the ecliptic.

Referring now to the actuation of parts resulting from the rotation of the casing 52 relatively to the housing 39, it will be seen that during such rotation the bevel gear 69 will roll about the relatively-fixed bevel pinion 50, thereby causing rotation of the shaft-parts 66, 65 and 67 within the tube 64, and like rotation of the ball 68 carried on the protruding portion of the shaft 67. As the axis about which the casing 52 rotates is eccentric to the globe 61, the path of the ball 68 will be similarly eccentric, and the same will thus simulate the eccentricity of the moon's orbit about the earth. The ellipticity of the moon's orbit is not represented. The rotation of the ball 68 is not for the purpose of representing the actual rotation of the moon upon its axis, since the latter so occurs that the same side of the moon is always presented to the earth, but for the purpose of more conveniently illustrating the phases of the moon. The latter is effected by so proportioning the actuating gearing that the same side of the ball 68 will always be presented to the sun-representing sphere 6, and arranging the ball 68 with the dark side thereof opposite said sphere. Thus, after the parts are once arranged as described, the arm 17 may be turned to any position and the light side of the ball 68 will be that facing toward the sphere 6.

In Figs. 4 and 5 the relative directions and paths of movement of the parts are indicated by broken lines and arrows. In Fig. 5 the parts 28, 68 and 61 are represented in each of four typical positions such as would be assumed successively, starting with the arm 17 at the right of the figure and the centers of the bodies 6, 28, 68 and 61 in alinement. The several successive positions of the three moving bodies are differentiated in said Fig. 5 by the addition, respectively, of the indices $a$, $b$, $c$, and $d$ to the reference numerals elsewhere employed for indicating the same. It may be noted also that in said Fig. 5 the vertical axes of the shafts 34 and 55 are designated, respectively by the characters $x$ and $y$, the points so indicated not being the poles of the globe 61, as might be inferred by casual observation of the figure.

From the foregoing it will be seen that our invention provides a comparatively simple and compact mechanism for representing and facilitating the explanation of the various planetary and lunar movements and phenomena such as the apparent northward and southward movement of the sun which results in the changes of season upon the earth, eclipses of the sun and moon, planetary transits, phases of the moon, tidal variations, etc. It will also be seen that the actuating mechanism is so concealed, or the outward appearance thereof so simplified, that the attention of the student will not be distracted thereby from the movements and relative positions of the bodies whose representation is the primary purpose of the mechanism.

Now, having described our invention, what we claim and desire to secure by Letters Patent is:

1. In apparatus of the class described, a stationary support, a radial arm revolubly mounted to move about said support, a carrier-member revolubly mounted terminally of said radial arm, said arm and carrier-member being movable in parallel planes, a tubular stem fixedly connected with said carrier-member and having a portion parallel to and a portion inclined to the axes of rotation of said arm and carrier-member, a globe rotatably mounted on the inclined portion of said stem, a flexible actuating-shaft connected with said globe and extending through said tubular stem, means connecting the support and carrier-member to actuate the latter relatively to the radial arm at a rate proportional to the rate of rotation of the arm about the support, and a gear-train connecting the radial arm and flexible shaft for actuating the latter in accordance with movement of the carrier-member about the arm-terminal.

2. In a planetarium, a fixed standard, an arm mounted to swing thereabout, a shaft journaled upon said arm, a bevel gear secured to the standard, a bevel pinion carried by said shaft and meshing with said gear to roll thereon during movement of the arm about the standard, a second bevel pinion carried by said shaft, a second bevel gear revolubly mounted coaxially with the first and meshing with said second pinion, and a ball-supporting arm connected with said second bevel gear and actuatable thereby.

3. In a planetarium, a supporting standard, means revolubly mounted thereon and having a radial arm, a carrier-member mounted at the outer end of said radial arm to revolve thereabout in a plane parallel with the plane of movement of the arm, a tubular part affixed to the carrier-member eccentrically to the axis thereof and having an angular portion extending convergently to said axis in a plane intersecting the same longitudinally, a globe rotatably mounted on the angular portion of the tubular part, actuating means connecting the standard and carrier-member for rotating the latter to maintain said plane of the tubular part in parallelism throughout revolution of the radial arm about the standard, a shaft having a flexible portion and fitting revolubly within said tubular part, said shaft connected at one end with said globe, and a gear-train connected with the other end of said shaft and having a member connected with the radial arm, whereby the globe is rotated during rotation of the carrier-member relatively to the arm.

4. In a planetarium, a vertical supporting standard, a swinging arm mounted thereon and revoluble horizontally thereabout, a carrier-member revoluble about a vertical axis at the outer end of the arm, a vertical globe-supporting stem affixed to said carrier-member eccentrically to the axis of rotation of said member, a part revolubly mounted on said stem, a curved tubular member carried by said part and having a vertical terminal portion, a shaft having a flexible portion fitting revolubly within said curved tubular member, said shaft protruding from the vertical terminal portion of said member, and actuating means connected with the other end of said shaft for rotating the same in a definite ratio to the revolution of the swinging arm about the standard.

5. In a planetarium, bodies for representing the earth and the moon, tubular supporting means for said bodies, revoluble shafts connected with said bodies and extending through said tubular supporting means, said tubular supporting means having curved portions and the shafts having flexible portions revoluble within said curved tubular portions, and incased interconnected actuating means for said shafts.

6. A structure as specified in claim 5, in combination with a body representing the sun, and means for moving the earth-representing body eccentrically thereabout.

7. A structure as specified in claim 6, in which the tubular supporting means for the moon-representing body is revoluble about an axis eccentric to the earth-representing body.

8. A structure as specified in claim 6, in which the means for moving the earth-representing body include a radial tubular arm swingable about the sun-body, a member swingably mounted terminally of the arm and carrying the tubular supporting means for the earth-representing body, and an actuating shaft inclosed by and revoluble within the radial tubular arm.

JOHN E. RUSSELL.
LE GRANDE S. HAWKES.